(12) United States Patent
Cribb

(10) Patent No.: US 7,527,017 B1
(45) Date of Patent: May 5, 2009

(54) PET BOWL ASSEMBLY

(76) Inventor: Nancy Cribb, 2004 SW. 35th Ave., Delray Beach, FL (US) 33445

( * ) Notice: Subject to any disclaimer, the term of this patent is extended or adjusted under 35 U.S.C. 154(b) by 286 days.

(21) Appl. No.: 11/588,541

(22) Filed: Oct. 27, 2006

(51) Int. Cl.
*A01K 5/00* (2006.01)
*A01K 7/00* (2006.01)

(52) U.S. Cl. .................................. 119/51.5; 119/61.55

(58) Field of Classification Search ............... 119/51.5, 119/61.5, 61.53, 61.54, 61.55, 61.56, 61.57
See application file for complete search history.

(56) References Cited

U.S. PATENT DOCUMENTS

| | | | | |
|---|---|---|---|---|
| 1,552,076 | A * | 9/1925 | Mosier | ...................... 119/72 |
| 3,076,435 | A * | 2/1963 | Seymour | .................... 119/77 |
| 3,205,861 | A | 9/1965 | Moore | |
| 3,441,003 | A * | 4/1969 | Lister et al. | ............. 119/61.53 |
| 3,749,063 | A | 7/1973 | Buffum | |
| D248,448 | S * | 7/1978 | McClure et al. | ........... D24/115 |
| 4,192,256 | A | 3/1980 | Clugston | |
| 4,286,546 | A * | 9/1981 | Moore | ................... 119/61.54 |
| 4,436,056 | A | 3/1984 | MacLeod | |
| D298,578 | S * | 11/1988 | Swartz et al. | ............. D30/130 |
| 4,990,345 | A * | 2/1991 | Webb | ........................ 426/123 |
| 5,069,167 | A * | 12/1991 | Kasselman | .............. 119/61.53 |
| 5,105,769 | A | 4/1992 | Smith et al. | |
| 5,117,778 | A * | 6/1992 | Imamura | ................... 119/51.5 |
| 5,209,184 | A | 5/1993 | Sharkan et al. | |
| 5,277,149 | A * | 1/1994 | East | .......................... 119/51.5 |
| 5,485,806 | A * | 1/1996 | Watanabe | ................. 119/51.5 |
| 5,488,927 | A | 2/1996 | Lorenzana et al. | |
| 5,560,315 | A * | 10/1996 | Lampe | ...................... 119/51.5 |
| 5,632,228 | A * | 5/1997 | Ybarra | ...................... 119/51.5 |
| 5,752,464 | A | 5/1998 | King et al. | |
| 5,809,935 | A | 9/1998 | Kolterman et al. | |
| 5,881,670 | A | 3/1999 | Pelsor | |
| 5,960,741 | A | 10/1999 | Ballen et al. | |
| D419,364 | S * | 1/2000 | Jarvis | ......................... D7/354 |
| 6,082,301 | A | 7/2000 | Kramer | |
| 6,101,974 | A | 8/2000 | Frohlich | |
| 6,142,101 | A * | 11/2000 | Pelsor | ..................... 119/61.54 |
| D434,946 | S * | 12/2000 | Jarvis | ....................... D7/554.4 |
| 6,467,428 | B1 * | 10/2002 | Andrisin et al. | ............ 119/51.5 |
| 6,478,277 | B2 * | 11/2002 | Winquest | ............... 248/346.01 |
| 6,644,241 | B2 * | 11/2003 | Brown | ....................... 119/61.5 |
| 6,718,911 | B2 * | 4/2004 | Greenberg | ................. 119/51.5 |

(Continued)

*Primary Examiner*—Yvonne R. Abbott
(74) *Attorney, Agent, or Firm*—Gold & Rizvi, P.A.; Glenn E. Gold; H. John Rizvi

(57) ABSTRACT

A pet bowl assembly for traveling in a vehicle includes a container for holding water, a triangular shaped bowl that is in fluid communication with the container, and a lid removably attached to the triangular shaped bowl. The container is shaped and sized to dimensionally correspond to a shape and size of a recess of a cup holder in a console of a vehicle. The container is securely retained within the cup holder, and the triangular shaped bowl extends partially between the front vehicle seats. In another embodiment, a pet bowl assembly is provided for storing both food and water. The pet bowl assembly includes a container for holding pet food where the container is releasably attached to a triangular shaped pet bowl that is filled with water. The embodiments optionally include a splashguard for preventing spilling when a pet is drinking from the bowl and when a vehicle is in motion.

11 Claims, 4 Drawing Sheets

U.S. PATENT DOCUMENTS

| | | | |
|---|---|---|---|
| D499,610 S * | 12/2004 | Laib | D7/550.1 |
| 6,912,970 B2 * | 7/2005 | Sage, Jr. | 119/61.5 |
| 6,971,331 B1 | 12/2005 | Rohrer | |
| 7,296,539 B2 * | 11/2007 | Iljas | 119/61.54 |
| 7,387,082 B1 * | 6/2008 | Fried | 119/61.5 |
| D575,007 S * | 8/2008 | Dye, Jr. | D30/123 |
| 2003/0116094 A1 * | 6/2003 | Dlin | 119/61 |
| 2007/0272163 A1 * | 11/2007 | Leary | 119/61.54 |
| 2008/0196668 A1 * | 8/2008 | Clark | 119/51.5 |

* cited by examiner

PET BOWL ASSEMBLY

BACKGROUND OF THE INVENTION

1. Field of the Invention

The present invention relates to pet accessories. More particularly, the invention relates to a portable pet bowl apparatus particularly adapted for use in automobiles.

2. Discussion of the Related Art

Many pet owners enjoy bringing their pets along with them when traveling in a vehicle. When traveling with a pet, it is necessary to provide food and/or water to the animal, particularly when traveling long distances. Typically, water is provided in an open container comprising a circular bowl including a base integrally formed with a wall to form a concave receptacle. Conventional pet dishes generally make it impractical to supply water to a pet when traveling in a vehicle because the water spills from the receptacle when the animal is drinking or when the vehicle is in motion.

In an effort to reduce the annoyances of spilled water, some pet bowls include an anti-spilling feature comprising a lip or liquid guard. Generally, the lip is circumferentially disposed within the perimeter of the bowl to prevent spilling. Although the lip helps to reduce the amount of water spilled in some applications, prior art pet bowls include drawbacks when used for providing water to pets that travel in vehicles.

One drawback is that oftentimes the bowl is placed on a flat planar surface, such as the floor of a vehicle, without proper stabilization. As the driver negotiates the vehicle on the road, the motion of the vehicle tends to shift or move the bowl along the floor of the vehicle resulting in water spillage. Still another drawback of conventional pet bowls is that the bowl is used for either water or food, but generally not both. Because the proper care of a pet may require the supply of both water and food, especially when traveling long distances, the owner must provide two separate containers. This is inefficient and requires additional interior space.

Another drawback is that prior art pet bowls are typically bulky, large in size, heavy and not easily portable. The bowls are difficult or awkward to carry, making transport and use relatively cumbersome. Pet bowls for use in a vehicle further require fasteners, straps, hooks, or the like for securely attaching the bowl to a window, door, seat, armrest or other structure, making it cumbersome for a user to install in a vehicle.

Accordingly, there remains in the art a need for a pet bowl for providing water and/or food to pets that travel in a vehicle, wherein the bowl is inexpensive, lightweight, and optionally includes an anti-spilling feature for preventing the spillage of water from the bowl. There is also a need for a pet bowl that is portable, compact, useful for providing both food and water, and designed to be easily securely stabilized within a vehicle when the vehicle is in motion, without requiring auxiliary stabilizing components.

SUMMARY OF THE INVENTION

The present invention overcomes the deficiencies of the known art by providing a pet bowl assembly for use in a vehicle, wherein the pet bowl assembly is portable, gives rise to manufacturing economy, can be effectively secured to existing vehicle structure without requiring auxiliary stabilizing components, and is easy to maintain and use. Moreover, the overall construction of the pet bowl assembly provides an inwardly extending splashguard or lip that dampens or prevents water and/or food from spilling, and enables the bowl to be securely stabilized within the vehicle when a pet is drinking from the bowl or when a vehicle is in motion.

In accordance with one embodiment of the present invention, there is provided a pet bowl assembly comprising a container including a base and sidewall defining a container receptacle for holding food or water. The bowl includes a first wall, a second wall and a third wall, where the walls define a bowl receptacle that is in fluid communication with the container receptacle. The pet bowl assembly further includes a lid that is removably attached to the bowl, sealing the food or water within the bowl receptacle.

Advantageously, the container includes a shape and size that dimensionally corresponds to a shape and size of a recess of a cup holder in a console of a vehicle so that the container is securely retained within the recess of the cup holder. The container, and triangular shaped bowl are dimensionally configured to provide a selected storage capacity, and are integrally molded as one piece.

Preferably, the pet bowl assembly includes a splashguard that is either integrated along the interior perimeter adjacent the upper inner edge of the bowl receptacle or separately secured within the bowl receptacle for preventing food or water from spilling.

A lid is removably attached to the bowl by any one of a snap-on feature, a living hinge, a magnet, a clip, a rotating post, a hook and loop, sliding rails, threads, or pressure detents.

In accordance with an alternative embodiment of the present invention, there is provided a pet bowl assembly comprising a container including a container receptacle for holding pet food, and an upper portion having threads. The pet bowl assembly may include a triangular shaped bowl having a bowl receptacle for storing water where the bowl includes a threaded recess formed within the base of the bowl for detachably receiving the upper portion of the container, thereby sealing the pet food within the container receptacle.

In yet another embodiment of the present invention, there is provided a pet bowl assembly for use in a vehicle, the pet bowl assembly comprising a container including a container receptacle for holding pet food or water, a triangular-shaped bowl including a first wall, a second wall, a third wall, and a base, where the base and walls define a triangular bowl receptacle for holding water, and a lid removably attached to the triangular shaped bowl for sealing the water within the bowl receptacle.

Preferably, the container includes a shape and size that dimensionally corresponds to a shape and size of a recess of a cup holder that is included in any one of a console of a vehicle including a boat, truck, van, transport, airplane, camper, RV, bus, train, ATV, or a table, chair, dog house, kennel, or any other mode or device that includes a cup holder for securely holding a cup therein.

Preferably, the container, and the bowl are either integrally molded as one piece orienting the container receptacle to be in fluid communication with the bowl receptacle, or the container is separately attached to the bowl having a means for detachably receiving formed therein for releasable attachment of the container to the bowl. The means for detachably engaging may include any one of threads, a bayonet connection, a snap-on feature, slide means, magnets or pressure detents.

Regarding the embodiments described herein, as well as those covered by the claims, the pet bowl assembly is loaded with food and/or water and a lid is removably attached to the pet bowl. The pet bowl assembly is securely inserted within the recess of the cup holder of a vehicle console, allowing the bowl to extend partially between two front seats of a vehicle. While a triangular-shaped bowl is shown throughout the accompanying Figures, it is understood that this shape is merely exemplary in nature. Any other shape or configuration can be used as long as it facilitates positioning of the bowl between the front seats of the vehicle in order to enable easy access by a pet in the rear area of the vehicle. The lid may be opaque or transparent to enable a user to view the contents stored within the pet bowl. Further, the lid may include an extending grasp for assisting a user in removing the lid from the pet bowl. The container, pet bowl, lid and splash guard may be constructed from glass, ceramic, metal, tin, a rigid or resilient material, a light-weight synthetic material or a polymeric material including plastic, rubber, urethane or neoprene material, or any combination thereof.

DETAILED DESCRIPTION OF REPRESENTATIVE EMBODIMENTS

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention.

Figure 1:
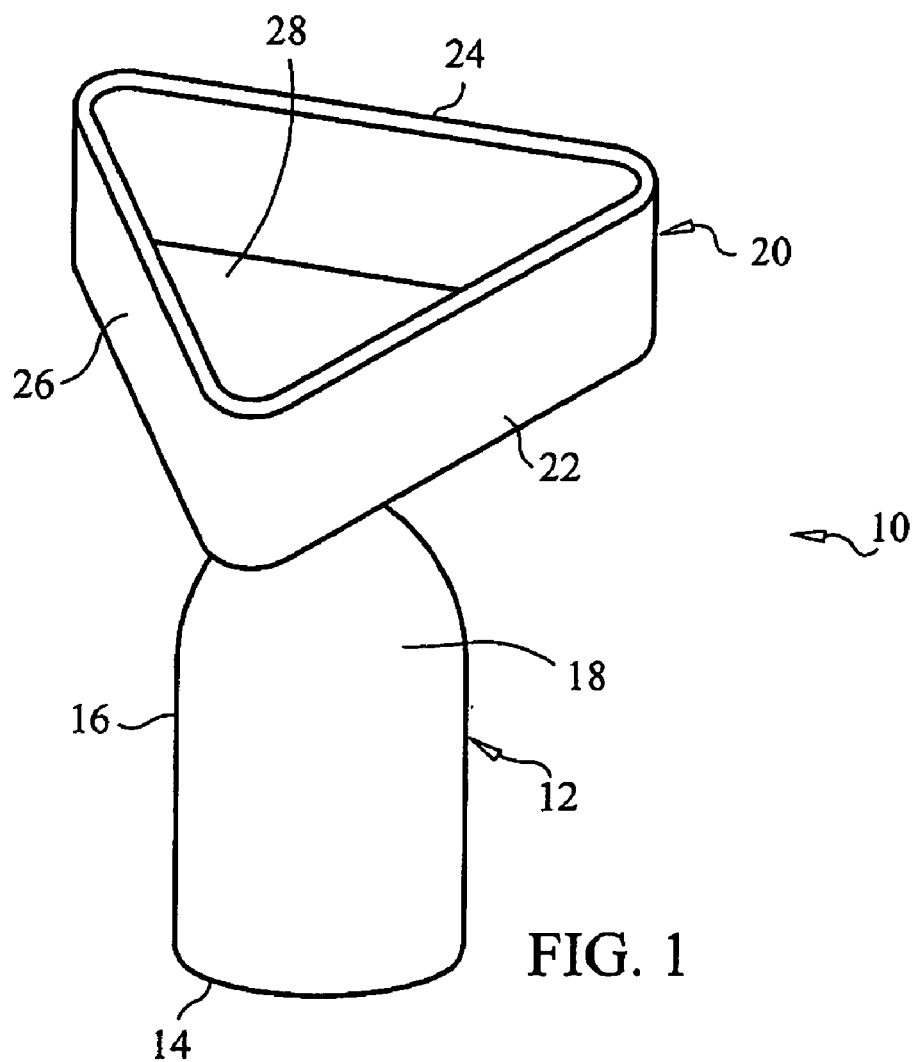
FIG. 1 is a perspective view of an embodiment of a pet bowl assembly, according to the present invention.

Referring now to the drawings wherein like elements are represented by like numerals throughout, there is shown in FIG. 1 a perspective view of a pet bowl assembly 10, according to one embodiment of the present invention. The pet bowl assembly 10 includes a container 12 comprising a base 14 integral with an upwardly extending sidewall 16 that define a container receptacle 18 for holding pet food or water. In one non-limiting example, sidewall 16 comprises a cylindrical wall that circumferentially extends from the base 14 to form a circular container 12.

Figure 5:
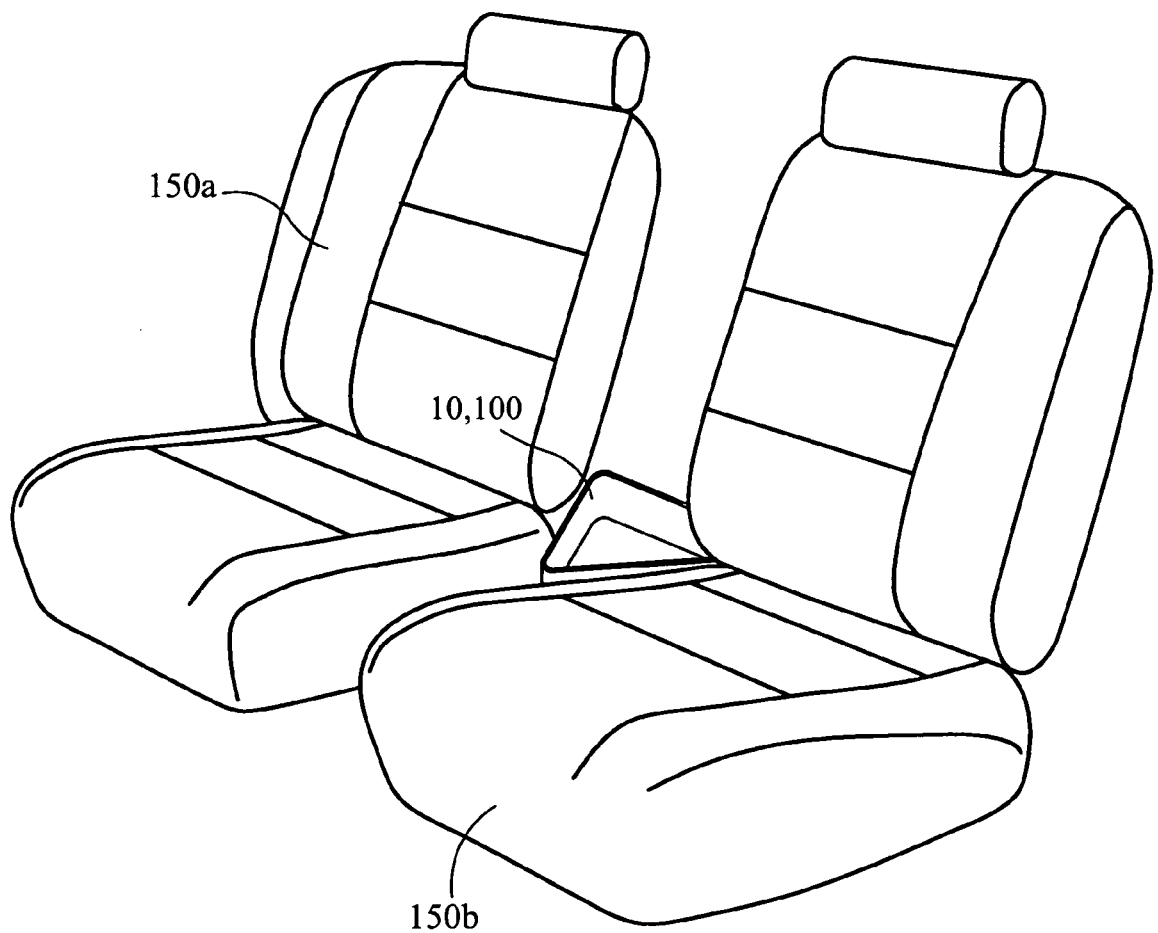
FIG. 5. is a perspective view of a pet bowl assembly removably inserted within a center console of a vehicle.

The pet bowl assembly 10 further includes a bowl 20. The bowl 20 includes a first wall 22, a second wall 24 and a third wall 26 that integrally form a bowl receptacle 28 for holding food or water. As seen in FIG. 1, the walls 22, 24, and 26 form a triangular-shaped bowl 20 to ensure that the pet bowl assembly 10 can be secured between two adjacent front seats 150a, 150b of a vehicle, as illustrated in FIG. 5. While a triangular shape is preferred, it will be apparent to those skilled in the art that alternate bowl shapes and geometries may be employed without departing from the scope of the invention. The height and diameter of container 12, and the height of walls 22, 24, and 26 of bowl 20 are dimensionally configured to provide a container receptacle 18, and bowl receptacle 28 having a desired storage capacity for holding a larger or smaller quantity of food or water.

Figure 2:
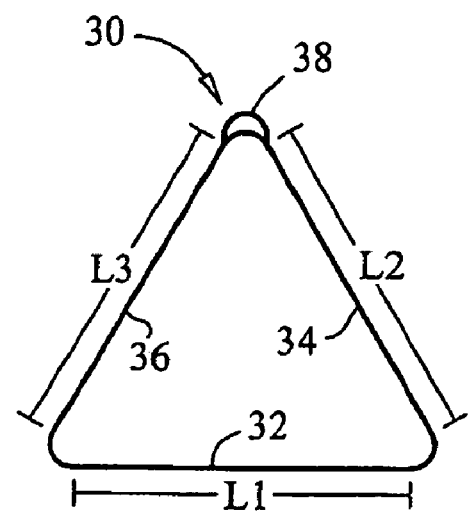
FIG. 2. is a top view of a lid for removably attaching to the pet bowl, according to the present invention.

Turning to FIG. 2, there is shown a top view of a lid 30 for removable attachment to bowl 20 for covering the contents stored within the bowl receptacle 28. Lid 30 includes a first lid side 32, a second lid side 34 and a third lid side 36 that are integrally associated to form a triangular shaped lid 30. The triangular shaped lid 30 is removably attached to the pet bowl 20 using a snap-on feature, a living hinge, a rotating post, clasp, hook and loop, sliding rails, a magnetic element, threads, or any other suitable lid securing means for easily and quickly removing and attaching the lid 30 to the pet bowl 20. Obviously, alternate shaped lids can be employed to complement the shape/geometry of the bowl.

In one exemplary embodiment, lid 30 includes a first lid side comprising a length L1 of 5 inches, a second lid side 34 comprising a length L2 of 6 inches, and a third lid side 36 comprising a length L3 of 6 inches. It will be understood that lid 30 may comprise other lengths L1, L2 and L3 that are adapted to conform to the triangular shape of pet bowl 20 for properly covering the opening of bowl receptacle 28. Lid 30 may be opaque or transparent for allowing a user to view the contents stored within the pet bowl 20. Lid 30 may further include an extending grasping tab 38 that is integrally formed along the outer edge of the lid 30 for easily grasping and removing the lid 30 from the pet bowl 20.

Figure 3:
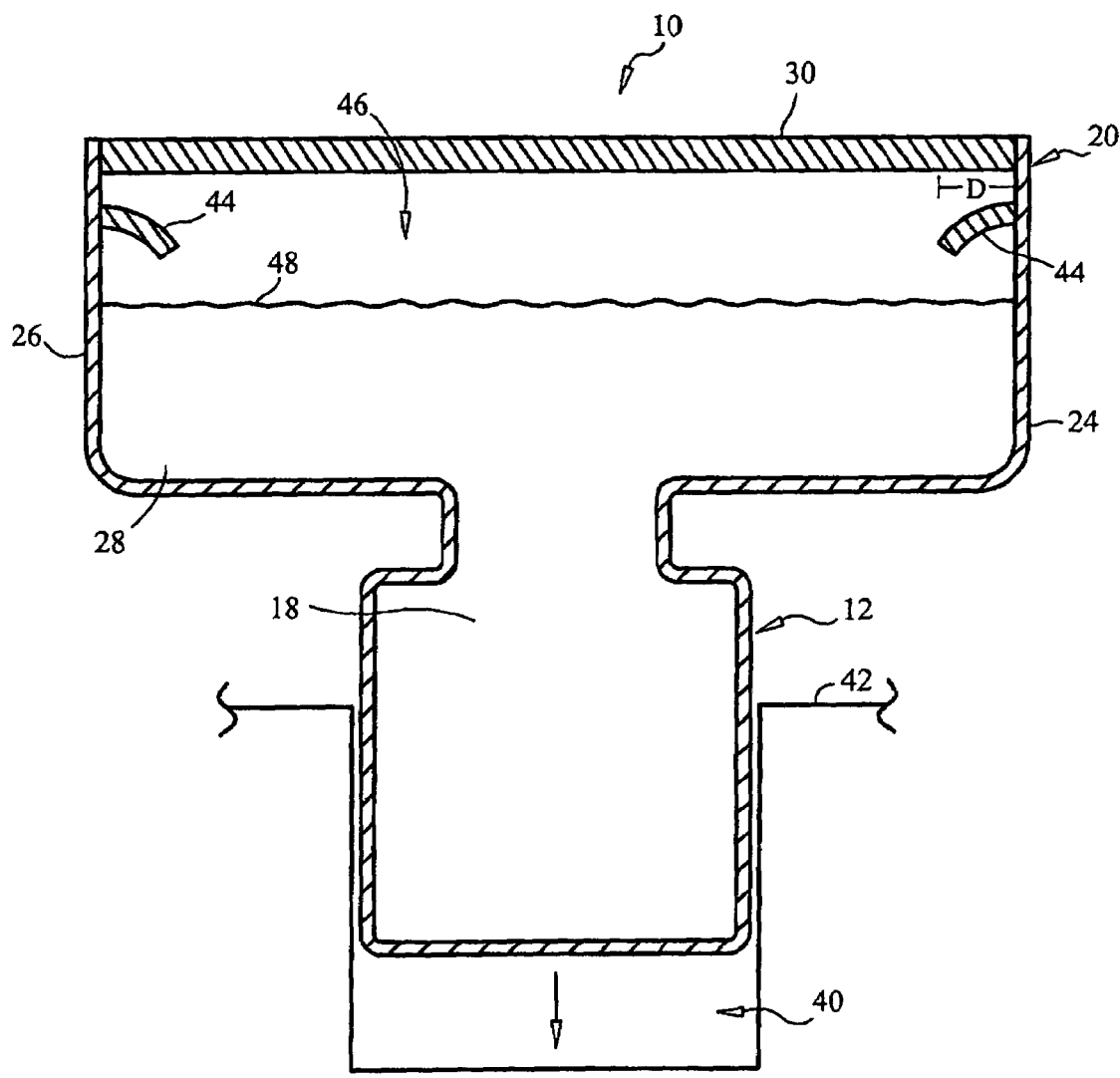
FIG. 3. is a front cross-sectional view of the pet bowl assembly, according to one embodiment of the present invention.

Referring now to FIG. 3, there is shown a front cross-section view of the pet bowl assembly 10, according to one embodiment of the present invention. As shown, pet bowl 20 is integrated with container 12 so that the bowl receptacle 28 is in fluid communication with the container receptacle 18. Both the container 12 and bowl 20 may be integrally formed as one-piece or separately attached together. The container 12 is shaped and sized to correspond with the shape and size of recess 40 of a cup holder 42 formed in a center console 148 of a vehicle.

In one alternative embodiment, the pet bowl assembly 10 may further comprise a liquid splashguard or lip 44 that is integrated along the interior perimeter, and adjacent the upper rim or edge of bowl 20. The lip 44 impedes the natural spilling of water 48 that occurs when an animal is drinking or when a vehicle is in motion. As shown in FIG. 3, lip 44 extends inwardly within the bowl receptacle 28 a distance D while providing an access opening 46. The access opening 46 is selected to accommodate a variety of different sized animals to enable the animal to easily access the water 48 within the bowl 20.

In another exemplary embodiment, lip 44 may comprise a separate triangular shaped element that is removably attached within the inner perimeter, and upper edge of bowl 20 to extend inwardly a distance D within the bowl receptacle 28. In one non-limiting example, lip 44 may snap into a recess along the inner perimeter of the bowl receptacle 28 or attach to the upper ridge of the bowl 20. In this configuration, lip 44 may be easily removed to facilitate washing the pet bowl assembly 10.

Prior to traveling with an animal, water is disposed within the container receptacle 18. As a result of both receptacles 18, 28 being in fluid communication with each other, the water 48 extends upwards within the bowl receptacle 28. The container 12 and bowl 20 are filled so that the surface of the water 48 extends below lip 44 to prevent spilling. The lid 30 is removably attached to bowl 20 sealably covering the water 48 stored within the bowl receptacle 28. A user may grasp the container 12 with one hand, and easily transport the pet bowl assembly 10 to a vehicle. The container 12 is disposed within recess 40 of the cup holder 42 of console 148 to securely stabilize the pet bowl assembly 10 in place.

Figure 4:
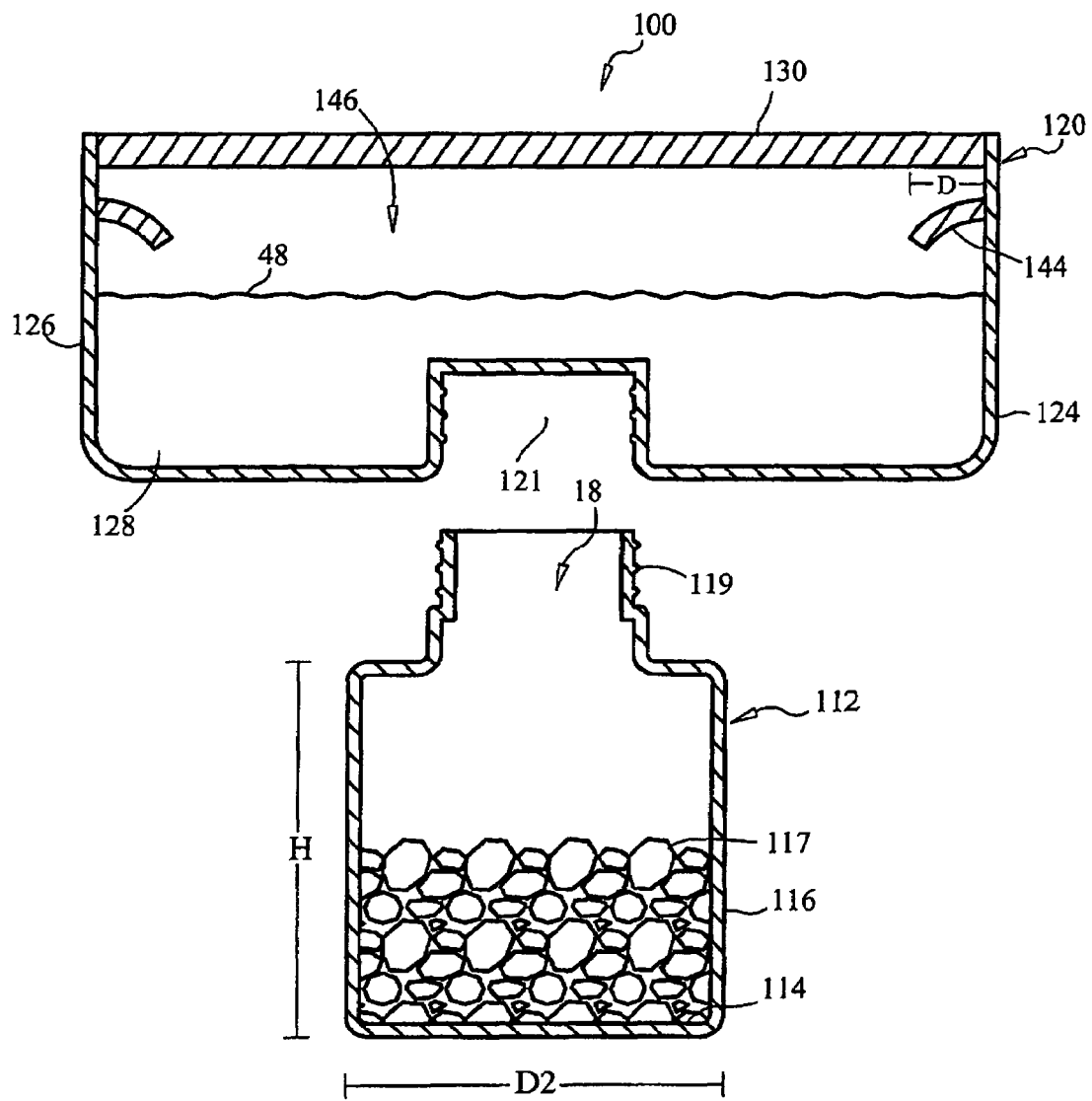
FIG. 4. is a front cross-sectional view of a pet bowl assembly, according to another embodiment of the present invention.

Turning now to FIG. 4, there is shown a front cross-sectional view of a pet bowl assembly 100, according to an alternative embodiment of the present invention. The pet bowl assembly 100 includes a circular container 112 comprising a base 114 that is integrally associated with a cylindrical sidewall 116 defining a container receptacle 118 for holding pet food or treats 117. In one exemplary embodiment, the circular container 112 includes a diameter D2 comprising 2.5 inches, and a height H also comprising 2.5 inches. It will be understood that the diameter D2 of container 112 is selected to conform to the diameter of recess 40 of cup holder 42, as illustrated earlier in FIG. 3. Container 112 further includes an upper portion 119 having threads for threadably engaging the container 112 within a bowl recess 121 that is formed within a pet bowl 120.

The pet bowl assembly 100 further includes a bowl 120. The pet bowl 120 includes a first wall 122 (not shown), a second wall 124 and a third wall 126 that integrally form a triangular shaped bowl receptacle 128 for holding water 48. The pet bowl 120 is advantageously configured as a triangular shaped bowl 120 for being securely disposed between two adjacent front seats 150a, 150b, of a vehicle, as illustrated in FIG. 5.

It will be noted that the combinational dimensions of the height H, and diameter D2 of container 12, 112, and the height of walls 22, 24, 26, 122, 124 and 126 are configured to provide a desired storage capacity of container receptacles 18, 118, and bowl receptacles 28, 128. The container 12, 112, bowl 20, 120, or both, may be configured for holding and storing larger or smaller quantities of food 117 and/or water 48 thus reducing the need for constant replenishment.

As shown in FIG. 4, the bowl further includes a threaded recess 121 that is formed within the base of bowl 120 for threadably receiving the upper portion 119 of container 112. Preferably, threaded recess 121 is formed in the center of the bottom surface of bowl 120, and shaped and sized to correspond to the shape and size of the upper portion 119 of container 112. It will be understood that the container 112 may be releasably attached to the bowl 120 using any suitable means for detachably engaging including but not limited to a snap-on feature, a bayonet connection, spring clips, detents or the like.

The pet bowl assembly 100 further includes a triangular shaped lid 130, as illustrated in FIG. 2. The lid 130 is shaped and sized to correspond to the shape and size of the triangular pet bowl 120. The lid 130 is removably attached to the pet bowl 120 for covering the bowl receptacle 128 and contents therein. As already noted previously herein, while a triangular shaped bowl and lid are preferred, various alternate shapes and geometries are possible. What is most important is that the geometry lends itself to being able to fit the bowl and lid between the adjacent front seats for easy access by the pet.

The pet bowl assembly 100 may further comprise a liquid splashguard or lip 144 that is integrated along the interior perimeter, and adjacent the upper rim or edge of bowl 120. The lip 144 prevents the natural spilling of water that occurs when an animal is drinking, when a vehicle is in motion and both. The lip 144 extends inwardly within the bowl receptacle 128 a distance D defining an access opening 146 for enabling a pet to gain access to the water 48. The access opening 146 is sized for accommodating different sized animals without restricting access to the water 48 within the bowl 120.

It will be noted that containers 12, 112, bowls 20, 120, lids 30, 130, and lips 44, 144 maybe made from a durable rigid or resilient material including any one of glass, metal, tin, ceramic, a light-weight synthetic material or a polymeric material including plastic, rubber, urethane or neoprene material, or any combination thereof. In addition, as will be recognized by one of ordinary skill in the art, the described embodiments are adaptable to a variety of different dimensions with the preferred use and purpose of the pet bowl assembly 10, 100 being securely held within the recess 40 of a cup holder 42 of a center console 148 of a vehicle.

In preparation for traveling with a pet, pet food 117 is disposed within container receptacle 118 of container 112. Container 112 is releasably attached to the pet bowl 120 by threadably engaging the upper portion 119 of container 112 within the threaded recess 121. Bowl receptacle 128 of bowl 120 is subsequently filled with water 48 so that the water level extends below lip 144 or splash guard to prevent spilling. The lid 130 is removably attached to pet bowl 120 sealing the water 48 within bowl receptacle 128. The pet bowl assembly 100 is easily transported to a vehicle where the container 112 is disposed within the recess 40 of cup holder 42 of console 148.

As illustrated in FIG. 5, the triangular shape of the pet bowl 20, 120 aids in ensuring that the pet bowl assembly 10, 100 is snugly secured between two adjacent front seats 150a, 150b of the vehicle further enhancing to stabilize the pet bowl assembly 10, 100 when a pet is drinking from the bowl 20, 120 or when the vehicle is in motion. With the container 12, 112 secured in recess 40 of cup holder 42, the user can easily remove the lid 30, 130 from the pet bowl 20, 120 to enable a pet to drink from the bowl 20, 120, through access opening 46, 146, respectively.

Although the described embodiments are directed for use in a vehicle, it should be emphasized that the embodiments may also be used in other applications such as a boat, truck, van, transport, table, airplane, chair, camper, RV, bus, train, ATV, dog house, kennel, or any other mode or device that includes a recess 40 of a cup holder 42 for securely holding a cup, beverage, container, or the like.

The pet bowl assembly 10, 100 of the present invention offers the advantages of a pet bowl assembly 10, 100 that is compact, and securely stabilized within a vehicle. The overall construction of the pet bowl assembly 10, 100 provides an inwardly extending splashguard or lip 44, 144 that dampens or prevents water 48 and/or food from spilling when a pet is drinking or when a vehicle is in motion.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A pet bowl assembly comprising:
   a container including a container receptacle for holding pet food, and an upper portion having a detachable engaging interface, wherein said container includes a shape and size that dimensionally corresponds to a shape and size of a recess of a cup holder in a console of a vehicle;
   a bowl having a bowl receptacle for storing water and having a mating detachable engaging interface formed therein for detachably receiving the upper portion of said container;
   a lid removably attached to said bowl for sealing water within the bowl receptacle; and
   a splash guard, said splash guard being either separately attached within or integrated along the interior perimeter adjacent the upper inner edge of said bowl receptacle, said splash guard extending inwardly of said bowl receptacle a distance for preventing said water from spilling.

2. The pet bowl assembly of claim 1, wherein said lid is removably attached to said triangular shaped bowl by at least one of: a snap-on mechanism, a living hinge, a magnet, a clip, a rotating post, a hook-and-loop fastening system, sliding rails, threads and pressure detents.

3. The pet bowl assembly of claim 2, wherein the pet bowl and lid have geometry such that, when the container is snugly seated within a vehicle cup holder recess, the bowl extends between two front seats of said vehicle.

4. The pet bowl assembly of claim 2, wherein the container, the bowl and the lid are triangular shaped.

5. The pet bowl assembly of claim 1, wherein said detachable engaging interface includes at least one of: threads, a bayonet connection, a snap-on feature, a slide means, magnets and pressure detents.

6. The pet bowl assembly of claim 5, wherein said container includes a shape and size dimensionally corresponding to a shape and size of a recess of a vehicle cup holder.

7. The pet bowl assembly of claim 6, wherein said pet bowl assembly further includes a splash guard provided along the interior perimeter adjacent the upper inner edge of said bowl receptacle.

8. The pet bowl assembly of claim 6, wherein said lid further comprises a triangular-shaped lid removably attached to the triangular shaped bowl by at least one of: a snap-on feature, a living hinge, a magnet, a clip, a rotating post, a hook and loop, sliding rails, threads, or pressure detents.

9. The pet bowl assembly of claim 8, wherein said means for detachably engaging includes at least one of: threads, a bayonet connection, a snap-on feature, a slide means, magnets and pressure detents.

10. The pet bowl assembly of claim 9, wherein the pet bowl and lid have geometry such that, when the container is snugly seated within a vehicle cup holder recess, the bowl extends between two front seats of said vehicle.

11. A pet bowl assembly for use in a vehicle, said pet bowl assembly comprising:
   a container including a container receptacle for holding pet food or water
   a triangular shaped bowl including a first wall, a second wall, a third wall, and a base, said base and walls defining a bowl receptacle for holding water,
   wherein the container is separately attached to the bowl, the bowl having detachable engagement means formed therein for releasably attaching said container to said bowl; and
   a lid being removably attached to said triangular shaped bowl for sealing the water within said bowl receptacle.

* * * * *